(12) United States Patent
Takeuchi et al.

(10) Patent No.: US 9,995,258 B2
(45) Date of Patent: Jun. 12, 2018

(54) FUEL SUPPLY DEVICE AND CONTROL METHOD

(71) Applicant: DENSO CORPORATION, Kariya, Aichi pref. (JP)

(72) Inventors: Hisaharu Takeuchi, Kariya (JP); Ryou Katsura, Kariya (JP)

(73) Assignee: DENSO CORPORATION, Kariya (JP)

( * ) Notice: Subject to any disclaimer, the term of this patent is extended or adjusted under 35 U.S.C. 154(b) by 166 days.

(21) Appl. No.: 15/048,304

(22) Filed: Feb. 19, 2016

(65) Prior Publication Data

US 2016/0245217 A1 Aug. 25, 2016

(30) Foreign Application Priority Data

Feb. 23, 2015 (JP) .................................. 2015-033039
Nov. 11, 2015 (JP) .................................. 2015-221533

(51) Int. Cl.
| | | |
|---|---|---|
| *F02D 41/30* | (2006.01) | |
| *F02M 37/00* | (2006.01) | |
| *F02D 33/00* | (2006.01) | |
| *F02M 21/02* | (2006.01) | |

(Continued)

(52) U.S. Cl.
CPC ....... *F02M 37/0052* (2013.01); *F02D 33/006* (2013.01); *F02M 21/0221* (2013.01); *F02D 41/0025* (2013.01); *F02D 41/0027* (2013.01); *F02D 41/042* (2013.01); *F02D 41/3005* (2013.01); *F02D 2200/0602* (2013.01); *F02D 2200/0606* (2013.01); *F02D 2250/02* (2013.01); *F02M 37/0029* (2013.01);

(Continued)

(58) Field of Classification Search
CPC ............ F02D 41/3005; F02M 37/0029; F02M 37/0047; F02M 37/0052
See application file for complete search history.

(56) References Cited

U.S. PATENT DOCUMENTS 5,197,442 A * 3/1993 Blumenstock ... B60K 15/03504
123/198 D
5,479,906 A * 1/1996 Collie ................ F02M 21/0212
123/304
(Continued)

FOREIGN PATENT DOCUMENTS

JP 5-126005 5/1993
JP 2003-56409 2/2003
(Continued)

*Primary Examiner* — Jacob Amick
*Assistant Examiner* — Charles Brauch
(74) *Attorney, Agent, or Firm* — Nixon & Vanderhye PC

(57) ABSTRACT

A fuel supply device includes a sub fuel tank disposed in a return fuel line, a pressure reduction valve, and a recirculation cutoff valve. When an internal combustion engine stops, the fuel supply device opens the pressure reduction valve and closes the recirculation cutoff valve. Due to this first transfer state, a liquefied gas fuel in a common rail is transferred to the sub fuel tank. Thereafter, the fuel supply device closes the pressure reduction valve and opens the recirculation cutoff valve. Due to this second transfer state, the liquefied gas fuel in the sub fuel tank is transferred to a main fuel tank. The fuel supply device repeatedly alternates between the first and second transfer states to collect the liquefied gas fuel from the common rail to the main fuel tank.

13 Claims, 7 Drawing Sheets

(51) Int. Cl.
*F02D 41/04* (2006.01)
*F02D 41/00* (2006.01)

(52) U.S. Cl.
CPC ..... *F02M 37/0047* (2013.01); *F02M 37/0088* (2013.01); *Y02T 10/32* (2013.01)

(56) References Cited

U.S. PATENT DOCUMENTS

| | | | | |
|---|---|---|---|---|
| 5,690,078 | A | * | 11/1997 | Ofner ................. F02M 21/0212 123/27 R |
| 5,775,281 | A | * | 7/1998 | Smith .................... F02B 43/00 123/179.8 |
| 2012/0143480 | A1 | * | 6/2012 | Pursifull ............ F02D 19/0615 701/105 |
| 2012/0279474 | A1 | * | 11/2012 | Hoefner ............ F02M 37/0047 123/448 |
| 2013/0238226 | A1 | * | 9/2013 | Slaymaker ........... F02D 41/065 701/113 |

FOREIGN PATENT DOCUMENTS

| | | |
|---|---|---|
| JP | 2005-30327 | 2/2005 |
| JP | 2008-25481 | 2/2008 |
| JP | 2008-298042 | 12/2008 |

* cited by examiner

FUEL SUPPLY DEVICE AND CONTROL METHOD

CROSS REFERENCE TO RELATED APPLICATION

The present application is based on Japanese Patent Application No. 2015-33039 filed on Feb. 23, 2015 and Japanese Patent Application No. 2015-221533 filed on Nov. 11, 2015, disclosure of which is incorporated herein by reference.

TECHNICAL FIELD

The present disclosure relates to the technical field of supplying liquefied gas fuel from a fuel tank to an internal combustion engine.

BACKGROUND

Conventionally, for example as described in JP 2005-30327 A, dimethyl ether (DME), which is a type of liquefied gas fuel, is accumulated in a common rail after an internal engine is stopped. The DME is heated by the internal combustion engine, and as a result becomes a high pressure gas. In this case, the DME may leak into the combustion chamber. After leaking into the combustion chamber, the DME may cause abnormal combustions to occur when the internal combustion engine is started.

In this regard, according to the fuel supply device of JP 2005-30327 A, a purge tank is used to temporarily collect the DME remaining in the common rail. The purge tank is at a lower pressure than the fuel tank. Then, the vaporized DME in the purge tank is re-liquefied by a compressor and transferred to the fuel tank. Due to this operation, the DME in the common rail is collected into the fuel tank.

SUMMARY

However, in the configuration described in JP 2005-30327 A, the compressor is needed to re-liquefy the vaporized fuel, and to then transfer the re-liquefied fuel to the fuel tank. Consequently, the configuration of the fuel supply device may become complicated. For this reason, there is a demand for a technique in which liquefied gas fuels may be collected without using a compressor or the like.

In view of the above points, it is an object of the present disclosure to provide a fuel supply device and the like in which a liquefied gas fuel within a common rail may be collected into a fuel tank, while avoiding a complicated configuration.

To achieve the above object, in one aspect of the present disclosure, there is provided a fuel supply device for recirculating a portion of a liquefied gas fuel supplied from a fuel tank to a common rail of an internal combustion engine, the portion of the liquefied gas fuel being recirculated through a return fuel path to the fuel tank, the fuel supply device including an inflow unit disposed in the return fuel path that receives the liquefied gas fuel flowing in the return fuel path, a first control valve that controls a flow of the liquefied gas fuel from the common rail to the inflow unit, a second control valve that controls a flow of the liquefied gas fuel from the inflow unit to the fuel tank, and a valve control unit that, after the internal combustion engine stops, repeatedly alternates between a first transfer state in which the valve control unit controls the second control valve to close and the first control valve to open, thereby transferring the liquefied gas fuel in the common rail to the inflow unit, and a second transfer state in which the valve control unit controls the first control valve to close and the second control valve to open, thereby transferring the liquefied gas fuel, which was transferred into the inflow unit during the first transfer state, into the fuel tank.

During the first transfer state of the present disclosure, by closing the second control valve and opening the first control valve, the liquefied gas fuel in the common rail is transferred to the inflow unit. As the temperature in the inflow unit rises due to the liquefied gas fuel flowing in, this transfer stops due to a pressure difference between the common rail and the inflow unit decreasing.

Then, during the second transfer state, the liquefied gas fuel which was transferred to the inflow unit during the first transfer state is transferred to the fuel tank. As a result, the liquefied gas fuel in the inflow unit is vaporized, and the temperature, and thus the pressure, in the inflow unit is decreased. Therefore, by returning to the first transfer state, the liquefied gas fuel in the common rail can be transferred to the inflow unit.

By repeating the first transfer state and the second transfer state in the above manner, the liquefied gas fuel within the common rail may be collected into the fuel tank, while avoiding a complicated configuration.

Further, another aspect of the present disclosure further includes a pressure acquisition unit that obtains a pressure of each of the common rail, the inflow unit, and the fuel tank, where the valve control unit switches from the first transfer state to the second transfer state based on a pressure difference between the common rail and the inflow unit, and the valve control unit switches from the second transfer state to the first transfer state based on a pressure difference between the inflow unit and the fuel tank.

Further, according to yet another aspect of the present disclosure, there is provided a control method for a fuel supply device that recirculates a portion of a liquefied gas fuel supplied from a fuel tank to a common rail of an internal combustion engine, the portion of the liquefied gas fuel being recirculated through a return fuel path to the fuel tank, the fuel supply device including i) a first control valve that controls a flow of the liquefied gas fuel from the common rail to an inflow unit disposed in the return fuel path, ii) a second control valve that controls a flow of the liquefied gas fuel from the inflow unit to the fuel tank, and iii) a processor that controls the first control valve and the second control valve, the control method including a first pressure acquisition step of, after the internal combustion engine stops, obtaining a pressure of each of the common rail and the inflow unit, a first switching step of, based on a difference between the pressures obtained at the first pressure acquisition step, switching from a first transfer state in which the second control valve is closed and the first control valve is opened to transfer the liquefied gas fuel in the common rail to the inflow unit, to a second transfer state in which the first control valve is closed and the second control valve is opened to transfer the liquefied gas fuel, which was transferred to inflow unit, to the fuel tank, a second pressure acquisition step of, after switching to the second transfer state, obtaining a pressure of each of the inflow unit and the fuel tank, and a second switching step of, based on a difference between the pressures obtained at the second pressure acquisition step, switching from the second transfer state to the first transfer state.

According to these aspects of the present disclosure, switching from the first transfer state to the second transfer state is performed based on a pressure difference between the common rail and the inflow unit. Therefore, the first transfer state is appropriately terminated at a timing of when it becomes difficult for the liquefied gas fuel to move from the common rail to the inflow unit due to the pressure difference therebetween decreasing. Similarly, switching from the second transfer state to the first transfer state is performed based on a pressure difference between the inflow unit and the fuel tank. Therefore, the second transfer state is appropriately terminated at a timing of when it becomes difficult for the liquefied gas fuel to move from the inflow unit to the fuel tank due to the pressure difference therebetween decreasing.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
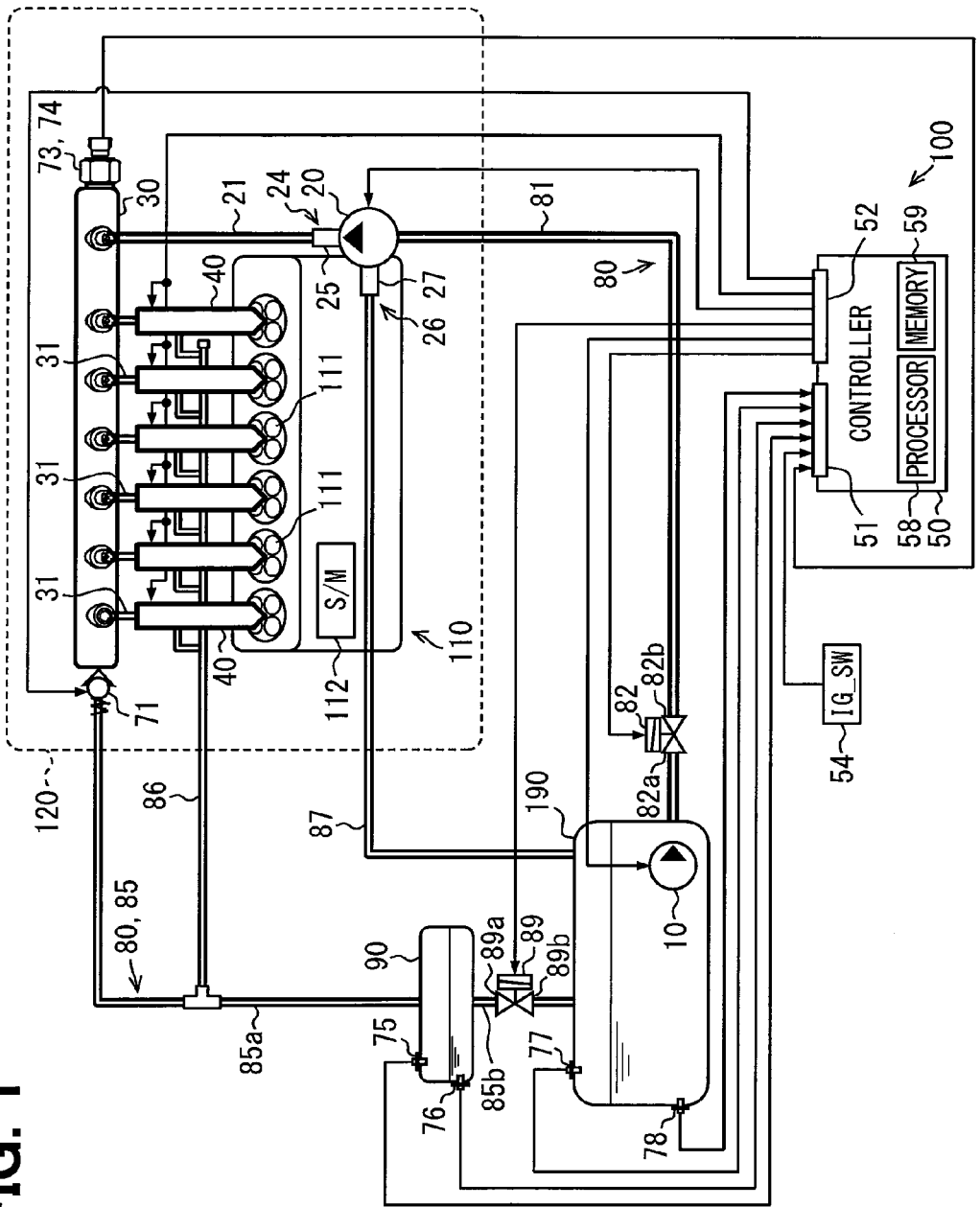
FIG. 1 is a view showing the entire configuration of a fuel supply device according to a first embodiment of the present disclosure.

Hereinafter, a plurality of embodiments of the present disclosure will be explained with reference to the figures. Further, portions of each embodiment which are common to each other are denoted with the same reference numerals, and overlapping explanations are omitted for brevity where appropriate. If only a portion of an embodiment is explained, the other portions of that embodiment correspond to the configurations of previously explained embodiments as appropriate. Further, the embodiments are not limited to only those combinations which are explicitly described. A plurality of embodiments may be partially combined with either other in any manner which does not cause specific problems.

First Embodiment

A fuel supply device 100 shown in FIG. 1 is mounted on a vehicle along with a main fuel tank 190 and an internal combustion engine 110. A liquefied gas fuel is stored in the main fuel tank 190, and the fuel supply device 100 supplies this liquefied gas fuel to the internal combustion engine 110. A portion of the liquefied gas fuel supplied to the internal combustion engine 110 is recirculated back to the main fuel tank 190.

The liquefied gas fuel stored in the main fuel tank 190 is dimethyl ether (DME). The DME fuel in the main fuel tank 190 is pressurized at a pressure according to its fuel vapor pressure, and is thereby liquefied. A safety valve is disposed in the main fuel tank 190. When the pressure inside the main fuel tank 190 exceeds a predetermined maximum pressure, the safety valve opens. The maximum pressure may be set at, for example, about 1.8 MPa.

The internal combustion engine 110 is stored in an engine room 120 of the vehicle. Specifically, the internal combustion engine 110 is a diesel engine. The DME fuel is injected into each cylinder through injectors 40, and is compressed within each cylinder. The DME fuel is combusted by compression in each combustion chamber 111 of the internal combustion engine 110. The internal combustion engine 110 converts the resulting heat energy into a motive force.

The internal combustion engine 110 includes a starter motor 112, a supply pump 20, a common rail 30, and the injectors 40. The starter motor 112 is an electric motor for starting the internal combustion engine 110. Specifically, the starter motor 112 transmits motive power to an output shaft of the internal combustion engine 110, which is able to cause the output shaft to rotate.

Figure 2:
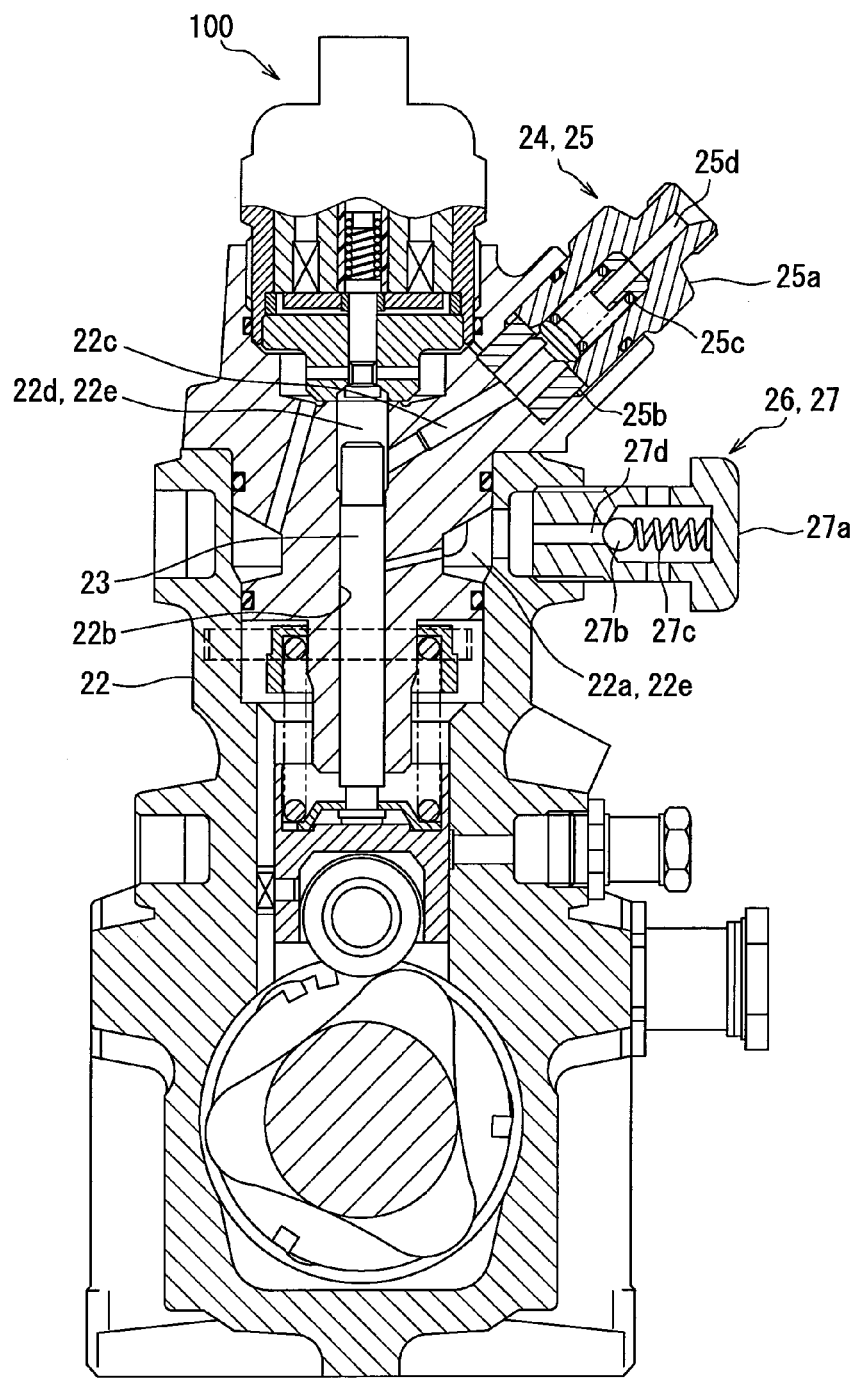
FIG. 2 is a cross section view showing the configuration of a supply pump.

The supply pump 20 shown in FIGS. 1 and 2 is a plunger-type pump in which a plunger 23 reciprocates to pump DME fuel. The supply pump 20 is connected to the common rail 30 through a high pressure line 21. Further, the supply pump 20 is driven by the output shaft of the internal combustion engine 110. The supply pump 20 pressurizes the DME fuel supplied from the fuel supply device 100, and then supplies the pressurized DME fuel through the high pressure line 21 to the common rail 30.

In addition to the plunger 23, the supply pump 20 includes a pump body 22, a delivery valve 25, and an overflow valve 27. The pump body 22 is formed from a pump fuel path 22e and a plunger chamber 22b. The pump fuel path 22e includes a fuel gallery 22a and a discharge path 22c. The fuel gallery 22a is a section of the pump fuel path 22e that supplies the DME fuel into the plunger chamber 22b. Specifically, the fuel gallery 22a is formed in an annular shape that surrounds the circumference of the plunger chamber 22b. The plunger chamber 22b reciprocably houses the plunger 23. A portion of the plunger chamber 22b forms a pressurizing chamber 22d in which the DME fuel is compressed by movement of the plunger 23. The discharge path 22c is a fuel path that allows high pressure DME fuel, which is pressurized in the pressurizing chamber 22d, to flow toward the high pressure line 21.

The delivery valve 25 is mounted to the pump body 22, and forms a discharge portion 24 of the supply pump 20. The delivery valve 25 includes a discharge valve body 25a, a discharge valve unit 25b, and a spring 25c. The discharge valve body 25a is bolt-shaped and is screwed into the pump body 22. A fuel path 25d is formed in the discharge valve body 25a along the axial direction. The fuel path 25d allows fluid communication between the discharge path 22c and the high pressure line 21.

The discharge valve unit 25b and the spring 25c are housed in the discharge valve body 25a. The discharge valve unit 25b is reciprocable in the fuel path 25d along the axial direction of the discharge valve body 25a. Specifically, when pressure applied by DME fuel from the side of the pressurizing chamber 22d is low, the discharge valve unit 25b is biased by the spring 25c to close the fuel path 25d from fluid communication. Then, when the supply pump 20 operates and begins to discharge DME fuel from the pressurizing chamber 22d, the discharge valve unit 25b opens due to pressure from the DME fuel being pumped. As a result, the discharge valve unit 25b allows the DME fuel to be discharged toward the common rail 30.

Here, a gallery pressure Pga is defined as the pressure of DME fuel in the fuel gallery 22a immediately after the internal combustion engine 110 has stopped operating. Further, a main tank pressure Pm is defined as the pressure of DME fuel in the main fuel tank 190. In this case, an opening pressure Pdo of the discharge valve unit 25b is set to be higher than the difference between the gallery pressure Pga and the main tank pressure Pm (i.e., Pdo>Pga−Pm).

Specifically, the gallery pressure Pga, which is estimated for when the internal combustion engine is stopped, may for example be considered as the saturated vapor pressure of DME fuel at a fuel temperature of about 70° C. (about 2.0 MPa). Meanwhile, the main tank pressure Pm may, for example, be considered as the saturated vapor pressure of DME fuel at a fuel temperature of about 30° C. (about 0.7 MPa). Therefore, the opening pressure Pdo of the discharge valve unit 25b is set to be above the difference of 1.3 MPa between these pressures. Specifically, in the present embodiment, the opening pressure Pdo is set at about 1.5 MPa.

The overflow valve 27 is mounted to the pump body 22, and forms an excess fuel discharging unit 26 of the supply pump 20. The overflow valve 27 includes a regulating valve body 27a, a regulating valve unit 27b, and a spring 27c. The regulating valve body 27a is bolt-shaped and is screwed into the pump body 22. A fuel path 27d is formed in the regulating valve body 27a along the axial direction. The fuel path 75d allows fluid communication between the fuel gallery 22a and an overflow line 87 which will be explained later.

The regulating valve unit 27b and the spring 27c are housed in the regulating valve body 27a. The regulating valve unit 27b is reciprocable in the fuel path 27d along the axial direction of the regulating valve body 27a. The regulating valve unit 27b is biased by the spring 27c to close, and regulates a maximum pressure of the fuel gallery 22a. Specifically, the regulating valve unit 27b opens when pressure in the fuel gallery 22a rises, and allows DME fuel to be discharged from the fuel gallery 22a to the overflow line 87. The opening pressure Pro of the regulating valve unit 27b is set to be higher than the saturated vapor pressure of DME fuel in the fuel gallery 22a. Specifically, in the present embodiment, the opening pressure Pro is set to be about 2.0 MPa. It should be noted that the opening pressure Pro of the regulating valve unit 27b may be set to be approximately equal to the opening pressure Pdo of the discharge valve unit 25b, or may be set to be higher than the opening pressure Pdo of the discharge valve unit 25b.

The common rail 30 shown in FIG. 1 is a tubular member formed of a metal material such as iron, steel, or the like. The common rail 30 stores DME fuel pressurized by the supply pump 20 while maintaining the pressure of the DME fuel. The common rail 30 may, for example, store about 30 cc of DME fuel. Further, the common rail 30 is connected to each of the injectors 40 through respective distribution lines 31. Accordingly, the common rail 30 supplies DME fuel to each of the injectors 40 through each distribution line 31

The injectors 40 supply DME fuel, which is supplied from the common rail 30, into each cylinder of the internal combustion engine 110. Specifically, the injectors 40 are inserted into throughholes formed in the head unit of the internal combustion engine 110, and include injection holes which are exposed inside each combustion chamber 111. The injectors 40 receive a control signal, and inject DME fuel from the exposed injection holes into the combustion chambers 111 based the control signal.

Next, the configuration of the fuel supply device 100 will be explained. The fuel supply device 100 includes a fuel line 80, a feed pump 10, a sub fuel tank 90, sensors 73-78, a pressure reduction valve 71, a supply cutoff valve 82, a recirculation cutoff valve 89, and a controller 50.

The fuel line 80 is piping that allows DME fuel to flow between the main fuel tank 190 and the internal combustion engine 110. Specifically, the fuel line 80 is a pipe member made of, e.g., metal. The fuel line 80 includes a supply line 81, a return fuel line 85, an injector leak line 86, and the overflow line 87.

The supply line 81 is piping that connects the main fuel tank 190 with the supply pump 20. Specifically, the supply line 81 forms a fuel path that supplies DME fuel from the feed pump 10 to the supply pump 20. The return fuel line 85 is piping that connects the common rail 30 with the main fuel tank 190. Specifically, the return fuel line 85 forms a fuel path that returns excess fuel discharged from the common rail 30 to the main fuel tank 190.

The injector leak line 86 is piping that connects each injector 40 with the return fuel line 85. Specifically, the injector leak line 86 forms a fuel path that merges leaked fuel discharged from each of the injectors 40 (i.e., fuel which was not injected) into the DME fuel flowing in the return fuel line 85. The overflow line 87 is piping that connects an overflow fuel outlet of the supply pump 20 with the main fuel tank 190. Specifically, the overflow line 87 forms a fuel path that returns overflow fuel from the supply pump 20 to the main fuel tank 190.

The feed pump 10 is an electric pump disposed within the main fuel tank 190. Specifically, the fuel pump 10 uses motive power from an electric motor to suck in DME fuel stored in the main fuel tank 190. Then, the feed pump 10 pressurizes the DME fuel to a feed pressure (e.g., 1 to 2 MPa), and pumps the DME fuel through the supply line 81 to the supply pump 20.

The sub fuel tank 90 is a container disposed in the return fuel line 85. The sub fuel tank 90 has a greater storage capacity than the common rail 30, e.g., by about 100 cc. Further, the storage capacity of the sub fuel tank 90 is set to be much smaller than that of the main fuel tank 190. DME fuel is discharged from the common rail 30, flows through the return fuel line 85, and flows into the sub fuel tank 90. Further, the sub fuel tank 90 is disposed at a physically higher location than the main fuel tank 190 in the vehicle. Moreover, the sub fuel tank 90 is positioned away from the engine room 120 of the vehicle, so as to avoid effects of heat from the internal combustion engine 110.

Further, for convenience, the portion of the return fuel line 85 from the common rail 30 to the sub fuel tank 90 is referred to as a first section 85a, while the portion of the return fuel line 85 from the sub fuel tank 90 to the main fuel tank 190 is referred to as a second section 85b. The first section 85a is connected to the ceiling wall of the sub fuel tank 90. The second section 85b is connected to the bottom wall of the sub fuel tank 90.

A rail pressure sensor 73 and a rail temperature sensor 74 are integrally mounted to an end portion of the common rail 30. A sub tank pressure sensor 75 and a sub tank temperature sensor 76 are mounted to wall portions of the sub fuel tank 90. A main tank pressure sensor 77 and a main tank temperature sensor 78 are mounted to the main fuel tank 190. Each of the sensors 73-78 is electrically connected to the controller 50.

Each of the pressure sensor 73, 75, 77 includes a metal diaphragm portion that receives pressure, and a strain gauge, resistive element, or the like that converts deformation of the diaphragm due to pressure into an electric signal. The rail pressure sensor 73 outputs, to the controller 50, an electric signal according to a rail pressure Pc in the common rail 30. The sub tank pressure sensor 75 outputs, to the controller 50, an electric signal according to a sub tank pressure Ps in the sub fuel tank 90. The main tank pressure sensor 77 outputs, to the controller 50, an electric signal according to a main tank pressure Pm in the main fuel tank 190.

Each of the temperature sensors 74, 76, 78 includes a thermistor whose resistance value changes with temperature, a thermocouple who voltage changes with temperature, or the like. The rail temperature sensor 74 outputs, to the controller 50, an electric signal according to a rail temperature Tc in the common rail 30. The sub tank temperature sensor 76 outputs, to the controller 50, an electric signal according to a sub tank temperature Ts in the sub fuel tank 90. The main tank temperature sensor 78 outputs, to the controller 50, an electric signal according to a main tank temperature Tm in the main fuel tank 190.

The pressure reduction valve 71 is mounted to an end portion of the common rail 30 in the axial direction. The pressure reduction valve 71 is an electromagnetic valve electrically connected to the controller 50. When the pressure reduction valve 71 opens, DME fuel is discharged from the common rail 30 into the return fuel line 85. The pressure reduction valve 71 is configured to open when the fuel pressure in the common rail 30 exceeds a predetermined maximum pressure. Further, the opening angle of the pressure reduction valve 71 is adjusted by the controller 50. Accordingly, the flow of DME fuel from the common rail 30 to the sub fuel tank 90 may be controlled.

The supply cutoff valve 82 is a two-way valve disposed on the supply line 81. The supply cutoff valve 82 includes a valve body that allows DME fuel to flow therethough, and an actuator that controls the valve body. The valve body of the supply cutoff valve 82 includes an inlet port 82a and an outlet port 82b, each of which is connected to the supply line 81. The supply cutoff valve 82 may cutoff the flow of DME fuel in the supply line 81 based on a control signal input to the actuator.

The recirculation cutoff valve 89 is a two-way valve disposed on the second section 85b of the return fuel line 85. The recirculation cutoff valve 89 includes a valve body that allows DME fuel to flow therethough, and an actuator that controls the valve body. The valve body of the recirculation cutoff valve 89 includes an inlet port 89a and an outlet port 89b, each of which is connected to the second section 85b. The recirculation cutoff valve 89 may cutoff the flow of DME fuel in the second section 85b based on a control signal input to the actuator. Further, the opening angle of the recirculation cutoff valve 89 is adjusted by the controller 50. Accordingly, the flow of DME fuel from the sub fuel tank 90 to the main fuel tank 190 may be controlled.

The controller 50 includes a processor 58, RAM, and a flash memory 59. The processor 58 is an operation circuit. Further, the flash memory 59 is a rewritable, non-volatile storage medium. The controller 50 also includes an input unit 51 and an output unit 52.

The input unit 51 is connected to a plurality of vehicle sensors including each of the sensors 73-78, and is also connected to the operating portion of an ignition switch 54. An operation is input to the ignition switch 54 to instruct the internal combustion engine 110 to start or stop. Specifically, the operator is a driver of the vehicle or the like, and may operate the ignition switch 54 to input either a start signal or a stop signal for the internal combustion engine 110 to the input unit 51.

The output unit 52 is connected to the starter motor 112, the feed pump 10, the supply pump 20, each of the injectors 40, the pressure reduction valve 71, the supply cutoff valve 82, and the recirculation cutoff valve 89. Control signals generated by the processor 58 are output by the output unit 52 to each of these elements.

After the internal combustion engine 110 shown in FIG. 1 stops operating, the DME fuel remaining in the common rail 30 is heated due to the internal combustion engine 110 and becomes a high pressure gas in the common rail 30. The vaporized DME fuel may leak through the distribution lines 31 and out of the injection holes of the injectors 40, thereby leaking into the combustion chambers 111. There is a concern that if DME fuel leaks into the combustion chambers 111, abnormal combustions may occur the next time that the internal combustion engine 110 is started.

Figure 3:
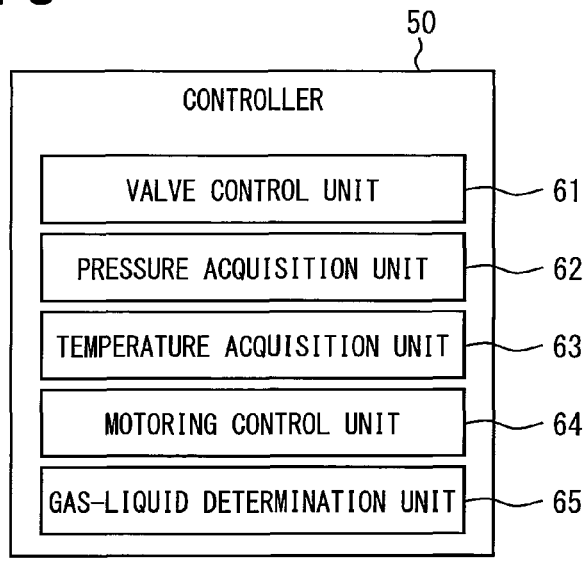
FIG. 3 is a view showing functional blocks of a controller.

In this regard, the fuel supply device 100 is configured to collect the DME fuel remaining in the common rail 30 into the main fuel tank 190. Next, the collection process performed by the fuel supply device 100 will be explained in detail. In the controller 50 shown in FIGS. 1 and 3, a control program stored on the flash memory 59 is executed by the processor 58, and includes a pressure acquisition unit 62, a temperature acquisition unit 63, a motoring control unit 64, a gas-liquid determination unit 65, and a valve control unit 61 as control blocks.

The pressure acquisition unit 62 obtains the rail pressure Pc measured by the rail pressure sensor 73, the sub tank pressure Ps measured by the sub tank pressure sensor 75, and the main tank pressure Pm measured by the main tank pressure sensor 77. The temperature acquisition unit 63 obtains the rail temperature Tc measured by the rail temperature sensor 74, the sub tank temperature Ts measured by the sub tank temperature sensor 76, and the main tank temperature Tm measured by the main tank temperature sensor 78.

Figure 4:
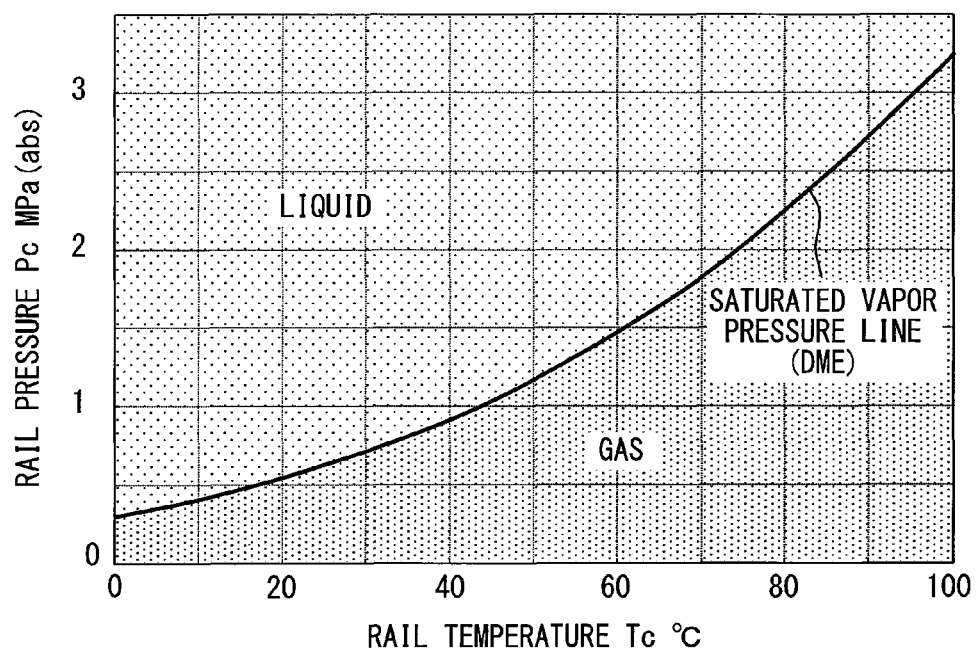
FIG. 4 is a view showing a saturated vapor pressure line of a DME fuel.

The motoring control unit 64 energizes the starter motor 112 based on a temperature difference between the rail temperature Tc the sub tank temperature Ts. As a result, the output shaft of the internal combustion engine 110 causes the supply pump 20 to temporarily operate. The gas-liquid determination unit 65 determines whether the DME fuel in the common rail 30 is vaporized based on a saturated vapor pressure line as shown in FIG. 4, using the rail pressure Pc and the rail temperature Tc obtained by the pressure acquisition unit 62 and the temperature acquisition unit 63.

The valve control unit 61 controls the pressure reduction valve 71, the supply cutoff valve 82, and the recirculation cutoff valve 89 to open and close. In order to collect DME fuel after the internal combustion engine 110 stops, the valve control unit 61 controls the recirculation cutoff valve 89 to close and the pressure reduction valve 71 to open (hereinafter, this state will be referred to as a "first transfer state"). After this first transfer state, the valve control unit 61 controls the pressure reduction valve 71 to close and the recirculation cutoff valve 89 to open (hereinafter, this state will be referred to as a "second transfer state"), based on a pressure difference between the rail pressure Pc and the sub tank pressure Ps obtained by the pressure acquisition unit 62. Then, based the pressure difference between the sub tank pressure Ps and the main tank pressure Pm, the valve control unit 61 switches from the second transfer state to the first transfer state. The valve control unit 61 continues to repeatedly alternate between the first transfer state and the second transfer state until the gas-liquid determination unit 65 positively determines vaporization.

Figure 5:
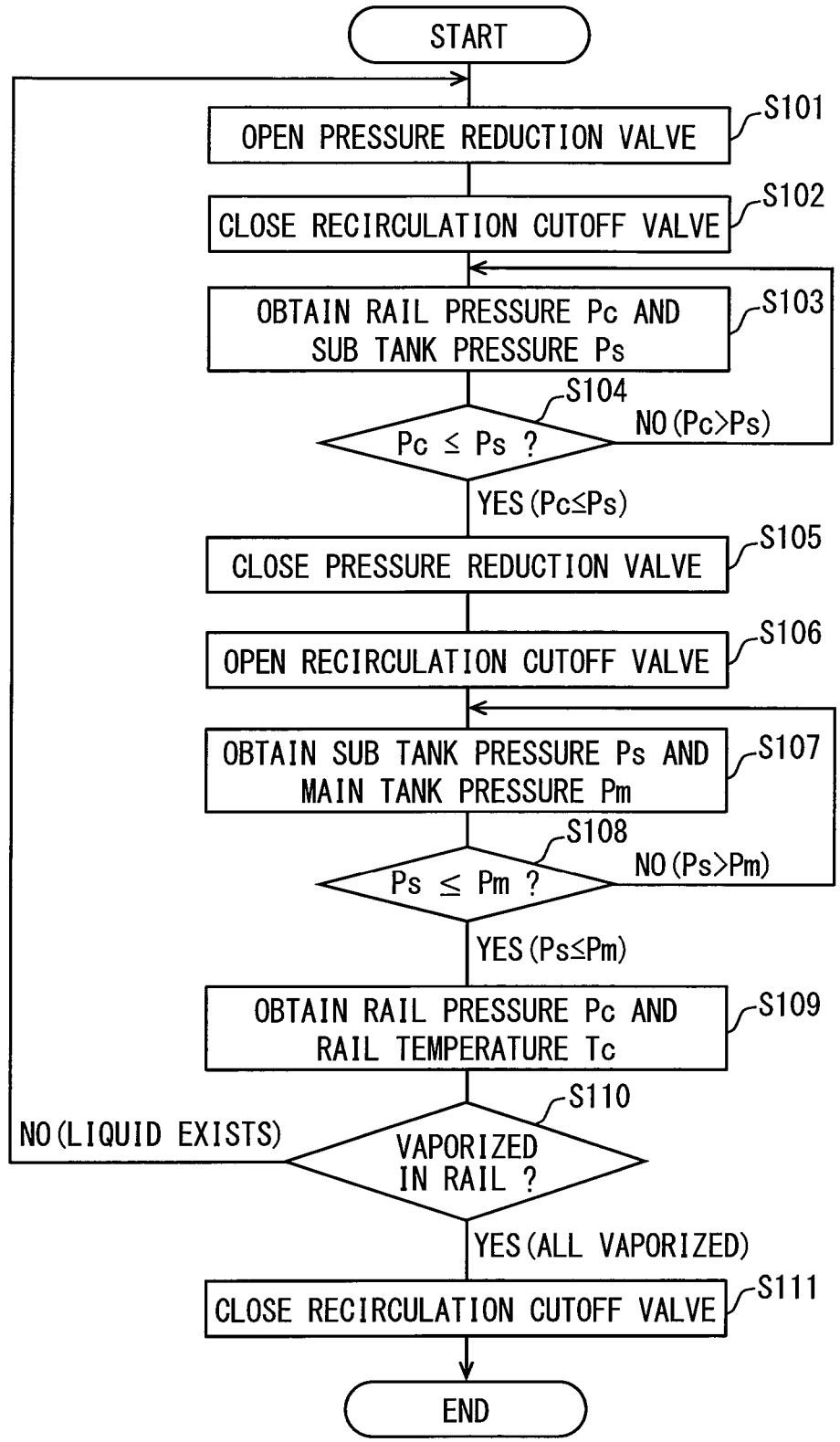
FIG. 5 is a flowchart showing a process performed by a processor of a controller.

Next, the processing performed by the processor 58 of the controller 50 will be explained in further detail based on FIGS. 5 and 6, with reference to FIG. 1. The process shown in the flowchart of FIG. 5 is started by the controller 50 when a stop signal is obtained from the input to the ignition switch 54.

At S101, a control signal for switching the pressure reduction valve 71 to an open state is output, and the process continues to S102. At S102, a control signal for switching the recirculation cutoff valve 89 to a closed state is output, and the process continues to S103. As a result of S101 and S102, the fuel supply device 100 switches to the first transfer state, in which DME fuel in the common rail 30 moves to the sub fuel tank 90.

At S103, the rail pressure Pc and the sub tank pressure Ps are obtained from the rail pressure sensor 73 and the sub tank pressure sensor 75, and the process continues to S104. At S104, a comparison is made between the rail pressure Pc and the sub tank pressure Ps obtained at S103. At S104, if it is determined that the rail pressure Pc is higher than the sub tank pressure Ps, then the processing of S103 and S104 are repeated, to wait until the rail pressure Pc and the sub tank pressure Ps are substantially equal. Then, when the rail pressure Pc is less than or equal to the sub tank pressure Ps, the process continues to S105.

Figure 6:
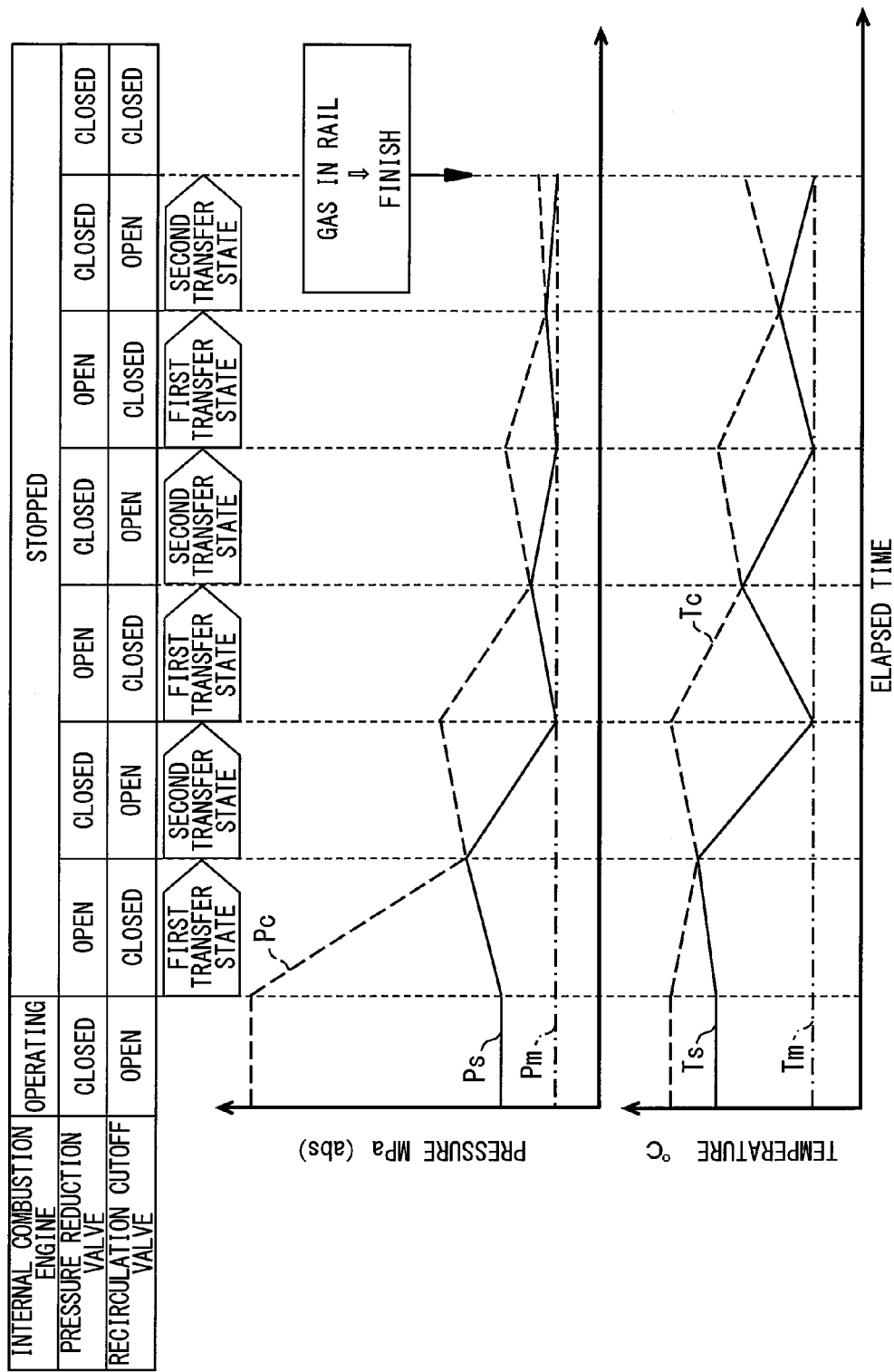
FIG. 6 is a time chart schematically showing changes in the pressure and temperature of each of a common rail, a sub fuel tank, and a main fuel tank after an internal combustion engine stops.

As shown in FIG. 6, during the first transfer state of S101-S104, the rail pressure Pc and the rail temperature Tc in the common rail 30 are reduced over time due to DME fuel flowing out. Meanwhile, the DME fuel flows into the sub fuel tank 90, thus the sub tank pressure Ps and the sub tank temperature Ts gradually rise. As the sub tank temperature Ts rises, the flow of DME fuel from the common rail 30 to the sub fuel tank 90 stops due the pressure difference between the rail pressure Pc and the sub tank pressure Ps decreasing. Accordingly, a switch from the first transfer state to the second transfer state will be performed. During the above first transfer state, since the storage capacity of the sub fuel tank 90 is greater than the storage capacity of the common rail 30, the sub tank pressure Ps and the sub tank temperature Ts increase by a smaller margin than the rail pressure Pc and the rail temperature Tc decrease by.

At S105 of FIG. 5, a control signal for switching the pressure reduction valve 71 to a closed state is output, and the process continues to S106. At S106, a control signal for switching the recirculation cutoff valve 89 to an open state is output, and the process continues to S107. As a result of S105 and S106, the fuel supply device 100 switches to the second transfer state, in which DME fuel which transferred to the sub fuel tank 90 during the first transfer state is transferred to the main fuel tank 190.

At S107, the sub tank pressure Ps and the main tank pressure Pm are obtained from the sub tank pressure sensor 75 and the main tank pressure sensor 77, and the process continues to S108. At S108, a comparison is made between the sub tank pressure Ps and the main tank pressure Pm obtained at S107. At S108, if it is determined that the sub tank pressure Ps is higher than the main tank pressure Pm, then the processing of S107 and S108 are repeated, to wait until the sub tank pressure Ps and the main tank pressure Pm are substantially equal. Then, when the sub tank pressure Ps is less than or equal to the main tank pressure Pm, the process continues to S109.

As shown in FIG. 6, during the second transfer state of S105-S108, the DME fuel in the sub fuel tank 90 moves toward the main fuel tank 190 due to the pressure difference between the sub fuel tank 90 and the main fuel tank 190 as well as gravity. Since DME fuel is discharged from the sub fuel tank 90 to the main fuel tank 190, DME fuel in the sub fuel tank 90 is vaporized. As a result, the sub tank pressure Ps and the sub tank temperature Ts decrease over time. Meanwhile, the main tank pressure Pm and the main tank temperature Tm remain substantially constant. As the sub tank pressure Ps falls toward the main tank pressure Pm, the flow of DME fuel from the sub fuel tank 90 to the main fuel tank 190 stops due to the pressure difference between the sub tank pressure Ps and the main tank pressure Pm decreasing.

At S109 of FIG. 5, the rail pressure Pc and the rail temperature Tc are obtained from the rail pressure sensor 73 and the rail temperature sensor 74, and the process continues to S110. At S110, it is determined whether collection of the DME fuel in the common rail 30 has been completed. Specifically, at S110, it is determined based on a saturated vapor pressure line (see FIG. 4) whether the DME fuel in the common rail 30 has completely vaporized.

At S110, if the presence of liquid DME fuel in the common rail 30 is determined, then the process returns to S101. As shown in FIG. 6, by iterating S101-S110, the first transfer state and the second transfer state are repeatedly alternated. As a result, the rail pressure Pc and the rail temperature Tc upon finishing each first transfer state gradually decreases. Then, at S110 shown in FIG. 5, if it is determined that the DME fuel has completely vaporized, then the process continues to S111. At S111, a control signal for switching the recirculation cutoff valve 89 to a closed state is output, and one set of collection processing is completed.

According to the first embodiment as explained above, during the second transfer state, the DME fuel in the sub fuel tank 90 undergoes vaporization. As a result, the sub tank temperature Ts and thus the sub tank pressure Ps are reduced. Therefore, when the second transfer state is switched back to the first transfer state, the liquefied gas fuel in the common rail 30 may transfer to the sub fuel tank 90. Accordingly, by repeatedly performing the first transfer state and the second transfer state, DME fuel in the common rail 30 may be collected into the main fuel tank 190 without complicating the structure of the fuel supply device 100.

In addition, when DME fuel is drawn out from the common rail 30 into the sub fuel tank 90, the DME fuel is vaporized in the sub fuel tank 90 and cooled due to latent heat of vaporization, and then is transferred to the main fuel tank 190. Accordingly, the main tank temperature Tm and the main tank pressure Pm may be prevented from rising. As a result, during the second transfer state, flow of DME fuel from the sub fuel tank 90 to the main fuel tank 190 may be ensured.

Further according to the first embodiment, switching from the first transfer state to the second transfer state is based on the pressure difference between the rail pressure Pc and the sub tank pressure Ps, and is performed when these pressures Pc, Ps are substantially equal. When controlled in this manner, the first transfer state may be terminated at an appropriate timing, i.e., when it is difficult for DME fuel to flow from the common rail 30 to the sub fuel tank 90.

In a similar manner, switching from the second transfer state to the first transfer state is based on the pressure difference between the sub tank pressure Ps and the main tank pressure Pm, and is performed when these pressures Ps, Pm are substantially equal. When controlled in this manner, the second transfer state may be terminated at an appropriate timing, i.e., when it is difficult for DME fuel to flow from the sub fuel tank 90 to the main fuel tank 190.

Further according to the first embodiment, the sub fuel tank 90 is disposed at a higher location than the main fuel tank 190. As a result, during the second transfer state, gravity is applied to the DME fuel in the sub fuel tank 90 which transfers to the main fuel tank 190. As a result, the DME fuel in the sub fuel tank 90 is quickly discharged, and the DME fuel may be more efficiently vaporized. Accordingly, collection of DME fuel from the common rail 30 may be more reliably performed.

Further according to the first embodiment, the storage capacity of the sub fuel tank 90 is greater than the storage capacity of the common rail 30. Accordingly, during each iteration of the first transfer state, more DME fuel may be transferred from the common rail 30 to the sub fuel tank 90. As a result, the first transfer state and the second transfer state may be iterated fewer times, and the amount of time needed to collect the DME fuel may be reduced.

Further according to the first embodiment, the opening pressure Pdo of the discharge valve unit 25b is set to be higher than the pressure difference between the gallery pressure Pga and the main tank pressure Pm. According to this configuration, immediately after the internal combustion engine 110 stops and DME fuel in the common rail 30 is collected, even if the pressure in the common rail 30 falls to around the main tank pressure Pm, the discharge valve unit 25b may be maintained in a closed state. Therefore, DME fuel in the supply line 81 may be stopped in the supply line 81 without flowing into the common rail 30.

According to the above, when the internal combustion engine 110 is restarted, the amount of time needed for DME fuel to fill the supply line 81 is reduced, and the supply pump 20 may quickly start to pump DME fuel to the injectors 40. In this regard, the amount of time needed to transfer DME fuel is reduced, and the internal combustion engine 110 may be restarted smoothly. In addition, even if the supply cutoff valve 82 is closed, the DME fuel remaining in the supply line 81 may be stored in the supply line 81 without flowing into the common rail 30.

Further according to the first embodiment, the opening pressure Pro of the regulating valve unit 27b is set to be higher than the opening pressure Pdo of the discharge valve unit 25b. Accordingly, it is possible to prevent DME fuel from flow out of the supply line 81 through the fuel gallery 22a and into the overflow line 87 due to the regulating valve unit 27b opening. According to the above, the internal combustion engine 110 may be more reliably restarted in a swift manner.

Further according to the first embodiment, collection of DME fuel from the common rail 30 to the main fuel tank 190 is continued until the DME fuel in the common rail 30 is completely vaporized. If the DME fuel in the common rail 30 is completely vaporized, it is difficult for pressure to increase to a degree of leaking into the combustion chambers 111. Therefore, by continuing the collection process until the DME fuel is confirmed to be vaporized, it is possible to reliably prevent abnormal combustions form occurring in the internal combustion engine 110.

Further according to the first embodiment, the sub fuel tank 90 is positioned outside of the engine room 120. Accordingly, it is difficult for the effects of heat released from the internal combustion engine 110 to affect the sub fuel tank 90. As a result, during the second transfer state, DME fuel in the sub fuel tank 90 may be reliably vaporized. Thus, the DME fuel in the common rail 30 may be reliably drawn out by the sub fuel tank 90.

Further, according to the first embodiment, the fuel gallery 22a corresponds to a "gallery space", the pressure reduction valve 71 corresponds to a "first control valve", the return fuel line 85 corresponds to a "return fuel path", the recirculation cutoff valve 89 corresponds to a "second control valve", the sub fuel tank 90 corresponds to a "inflow unit", the engine room 120 corresponds to a "space which houses the internal combustion engine", and the main fuel tank 190 corresponds to a "fuel tank".

Further, the processing of S103 corresponds to a "first pressure acquisition step", and the processing of S104-S106 corresponds to a "first switching step".

Further, the processing of S107 corresponds to a "second pressure acquisition step", and the processing of S108-S110 corresponds to a "second switching step".

Second Embodiment

Figure 7:
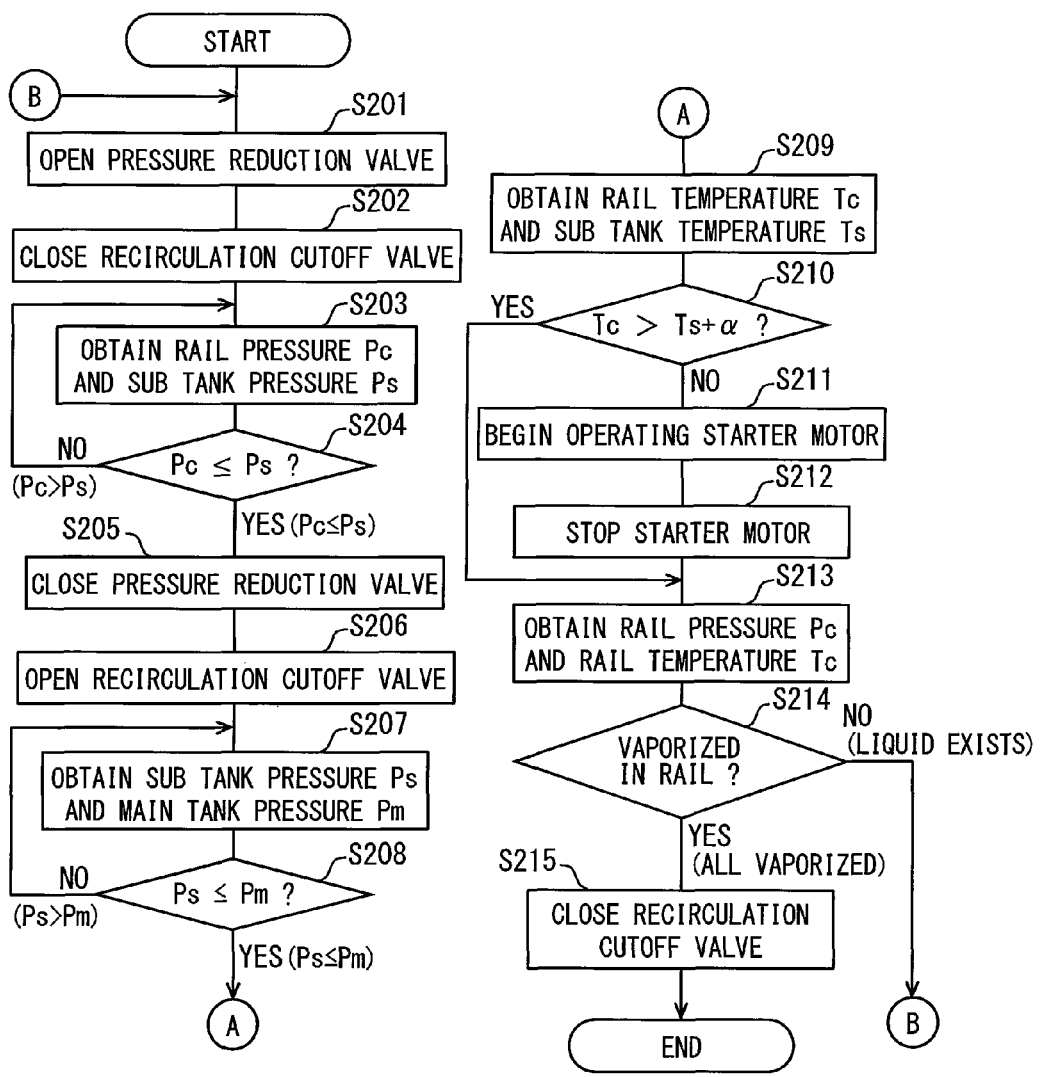
FIG. 7 is a flow chart showing a modified aspect of FIG. 5.
Figure 8:
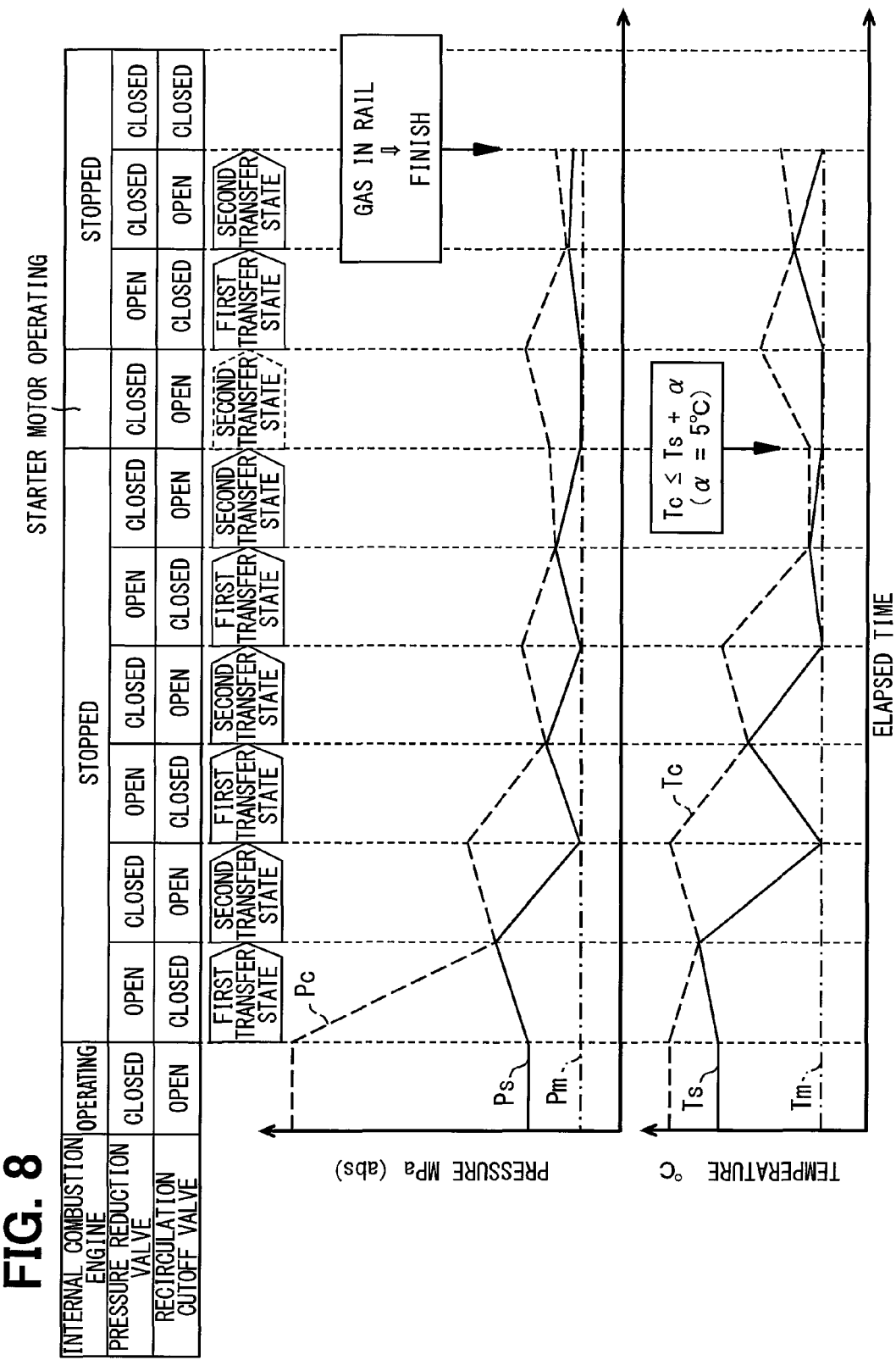
FIG. 8 is a time chart schematically showing changes in the pressure and temperature of each of a common rail, a sub fuel tank, and a main fuel tank when performing the process of FIG. 7.

A second embodiment of the present disclosure as shown in FIGS. 7 and 8 is a modification of the first embodiment. In the second embodiment, the starter motor 12 is operated using the motoring control unit 64 (see FIG. 3), thereby raising the rail temperature Tc. The specific processing contents of the second embodiment will be explained using FIG. 7, with reference to FIG. 1. Further, S201-S208 and S213-S215 of FIG. 7 are substantially the same as S101-108 and S109-S111 of the first embodiment (see FIG. 5).

At S209, the rail temperature Tc and the sub tank temperature Ts are obtained from the rail temperature sensor 74 and the sub tank temperature sensor 76, and the process continues to S210. At S210, a comparison is made between the rail temperature Tc and the sub tank temperature Ts to detect a temperature decrease in the rail temperature Ts. Specifically, at S210, it is determined whether a temperature difference between the rail temperature Tc and the sub tank temperature Ts exceeds a predetermined threshold a (for example, about 5° C.). At S210, if it is determined that the temperature difference between the rail temperature Tc and the sub tank temperature Ts exceeds 5° C., the process continues to S213.

Conversely, at S210, if it is determined that the temperature difference between the rail temperature Tc and the sub tank temperature Ts is less than or equal to 5° C., the process continues to S211. At S211, in order to increase the temperature difference between the rail temperature Tc and the sub tank temperature Ts, the starter motor 112 is energized. Due to the controls of S211, the internal combustion engine 110 is driven by the starter motor 112, and the output shaft of the internal combustion engine 110 causes the supply pump 20 to operate. Then at S212, energizing of the starter motor 112 is stopped, and thus the starter motor 112 and the supply pump 20 are stopped. Then, the process continues to S213.

As shown in FIG. 8, due the motoring operation of the internal combustion engine 110 at S209-S212, the rail pressure Pc and the rail temperature Tc in the common rail 30 may be increased again. Therefore, after switching from the second transfer state to the first transfer state, the DME fuel in the common rail 30 may be reliably discharged to the sub fuel tank 90. As a result, the rail pressure Pc may fall to a lower value than the pressure immediately before being raised by the motoring. Meanwhile, the rail temperature Tc is higher than the previous temperature. Therefore, the DME fuel becomes vaporized. When this vaporization of the DME fuel is confirmed, the collection process is terminated.

According to the second embodiment, the DME fuel in the common rail 30 may be collected into the main fuel tank 190 by repeating the first transfer state and the second state in the same manner as the first embodiment.

Further according to the second embodiment, by using the high pressure DME fuel remaining in the pressurizing chamber or discharge path of the supply pump 20, the pressure difference between the rail pressure Pc and the sub tank pressure Ps is increased. As a result, collection of DME fuel from the common rail 30 to the main fuel tank 190 reliably continues until the DME fuel in the common rail 30 is vaporized.

Further, even if the supply pump 20 is operated as in the second embodiment, DME fuel of the supply line 81 stops at the supply line 81 without completely passing through to the common rail 30. Accordingly, DME fuel remains in the supply line 81, and in the case of the second embodiment as well, the internal combustion engine 110 may be smoothly restarted.

In addition, according to the second embodiment, the supply pump 20 corresponds to a "high pressure pump", the motoring control unit 64 corresponds to a "pump controller". Further, the processing of S203 corresponds to a "first pressure acquisition step", and the processing of S204-S206 corresponds to a "first switching step". Further, the processing of S207 corresponds to a "second pressure acquisition step", and the processing of S208-S214 corresponds to a "second switching step".

Other Embodiment

A plurality of embodiments according to the present disclosure are described above. However, the present disclosure is not intended to be limited to the above embodiments. A variety of modifications and combinations which do not depart from the gist of the present disclosure are contemplated.

According to the above embodiments, switching between the first transfer state and the second transfer state is performed based on a pressure difference between the rail pressure Pc and the sub tank pressure Ps, and based on a pressure difference between the sub tank pressure Ps and the main tank pressure Pm. However, alternatively, switching from the first transfer state to the second transfer state may be performed based on a temperature difference between the rail temperature Tc and the sub tank temperature Ts. Similarly, switching from the second transfer state to the first transfer state may be performed based on a temperature difference between the sub tank temperature Ts and the main tank temperature Tm.

Further, for example, each iteration of the first transfer state and the second transfer state may be performed for a predetermined duration of time. In this case, switching between the first transfer state and the second transfer state is performed when the predetermined duration of time elapses. Further, the switching timing between the first transfer state and the second transfer state may be determined based on a combination of the pressure differences, temperature differences, and durations of time as described above.

According to the above described embodiments, the first transfer state is switched to the second transfer state when there is substantially no pressure difference between the rail pressure Pc and the sub tank pressure Ps. However, alternatively, switching from the first transfer state to the second transfer state may be performed when the pressure difference between the rail pressure Pc and the sub tank pressure Ps is at or below a predetermined threshold value. Similarly, switching from the second transfer state to the first transfer state may be performed when the pressure difference between the sub tank pressure Ps and the main tank pressure Pm is at or below a predetermined threshold value.

In the above described embodiments, a "pressure reduction valve" and a "recirculation cutoff valve" function as a "first control valve" and a "second control valve", respectively. However, the configurations and mounting positions of these valves may be changed as appropriate.

In the above described embodiments, the first transfer state and the second transfer state are repeated, and are terminated based on the DME fuel in the common rail becoming vaporized. However, the termination condition for repeating the first transfer state and the second transfer state is not limited to a gas-liquid determination of DME fuel in the common rail, and may be changed as appropriate. For example, the termination condition may be satisfied after the first transfer state and the second transfer state are repeated for a predetermined number of iterations. As another example, the termination condition may be satisfied after the first transfer state and the second transfer state are repeated for a predetermined period of time after the internal combustion engine stops, then terminated.

In the above described embodiments, whether the termination condition is satisfied or not is determined when switching from the second transfer state to the first transfer state. However, it is also acceptable to determine whether the termination condition is satisfied or not when switching from the first transfer state to the second transfer state.

In the above described second embodiment, the supply pump is operated through motoring when the temperature difference between the rail temperature Tc and the sub tank temperature Ts decreases. However, alternatively, the supply pump may be operated when the pressure difference between the rail pressure Pc and the sub tank pressure Ps decreases. Further alternatively, the supply pump may be operated after the first transfer state and the second transfer state have been iterated for a predetermined number of times.

In the above described embodiments, the storage capacity, position, and the like of the element corresponding to the sub fuel tank may be changed as appropriate. For example, the storage capacity of the sub fuel tank may be changed as appropriate according to the storage capacity of the common rail. Further as an example, the sub fuel tank may be positioned next to the main fuel tank, so as to be at the same height as the main fuel tank. Further as an example, the sub fuel tank may be positioned in the engine room.

In the above described embodiments, when DME fuel is collected from the common rail 30 after the internal combustion engine 110 stops, DME fuel in the supply line 81 is not completely discharged and remains within in the supply line 81 due to the one-way delivery valve 25 and overflow valve 27. The form of each of these valves may be changed as appropriate. Further, the opening pressure of each valve may be appropriated changed within a range exceeding the saturated vapor pressure of the main fuel tank. For example, the opening pressure of the overflow valve may be set to be slightly lower than the opening pressure of the delivery valve.

In the above described embodiments, the opening pressure Pdo of the discharge valve unit 25b is set using the gallery pressure Pga as a reference. However, alternatively, the pressure in areas of the pump fuel path 22e other than the fuel gallery 22a may be used as the reference when setting the opening pressure Pdo. For example, the opening pressure Pdo of the discharge valve unit 25b may be set to be higher than a pressure difference between the pressure of DME fuel in the discharge path 22c and the main tank pressure Pm.

In the above described embodiments, the supply pump is driven by the output shaft of the internal combustion engine. However, this kind of a "high pressure pump" may be an electric pump driven by an electric motor instead. According to this configuration, instead of the motoring control unit 64 (see FIG. 3), an electric motor may be energized based on a temperature difference between the rail temperature Tc and the sub tank temperature Ts, thereby establishing a control block which temporarily operates the high pressure pump.

In the above described embodiments, DME fuel is provided as an example of the liquefied gas fuel supply by the fuel supply system to the internal combustion engine. However, the liquefied gas fuel is not limited to DME fuel. For example, a diesel fuel such as a light fuel which includes DME as a primary component may be used as the liquefied gas fuel.

In the above described embodiments, the functions provided by the controller may corresponding to function blocks of a processor which execute a fixed program, or may be implemented as dedicated integrated circuits. Alternatively, different hardware and software, or any combination of these, may provide the various functions of the "control process" described in the above embodiments.

In the above described embodiments, the fuel supply device of the present disclosure is explained as being applied as supplying fuel to an internal combustion engine mounted in a vehicle. However, the fuel supply device is not limited to an internal combustion engine of a vehicle, and may supply fuel to internal combustion engines mounted in ships, railroad cars, aircraft, or the like. Additionally, the present disclosure is also applicable to a fuel supply device which supplies fuel consumed for an internal combustion engine for generating electricity.

The invention claimed is:

1. A fuel supply device for recirculating a portion of a liquefied gas fuel supplied from a fuel tank to a common rail of an internal combustion engine, the portion of the liquefied gas fuel being recirculated through a return fuel path to the fuel tank, the fuel supply device comprising:
   an inflow unit disposed in the return fuel path that receives the liquefied gas fuel flowing in the return fuel path;
   a first control valve that controls a flow of the liquefied gas fuel from the common rail to the inflow unit;
   a second control valve that controls a flow of the liquefied gas fuel from the inflow unit to the fuel tank; and
   a valve control unit that, after the internal combustion engine stops, repeatedly alternates between
      a first transfer state in which the valve control unit controls the second control valve to close and the first control valve to open, thereby transferring the liquefied gas fuel in the common rail to the inflow unit, and
      a second transfer state in which the valve control unit controls the first control valve to close and the second control valve to open, thereby transferring the liquefied gas fuel, which was transferred into the inflow unit during the first transfer state, into the fuel tank; wherein
   the return fuel path connects the common rail to the fuel tank, and
   the second control valve is disposed on the return fuel path between the inflow unit and the fuel tank.

2. The fuel supply device of claim 1, further comprising:
   a pressure acquisition unit that obtains a pressure of each of the common rail, the inflow unit, and the fuel tank, wherein
   the valve control unit switches from the first transfer state to the second transfer state based on a pressure difference between the common rail and the inflow unit, and
   the valve control unit switches from the second transfer state to the first transfer state based on a pressure difference between the inflow unit and the fuel tank.

3. The fuel supply device of claim 2, wherein
   the valve control unit switches from the first transfer state to the second transfer state when, during the first transfer state, the pressure of the common rail and the pressure of the inflow unit become substantially equal.

4. The fuel supply device of claim 2, wherein
   the valve control unit switches from the second transfer state to the first transfer state when, during the second transfer state, a pressure difference between the inflow unit and the fuel tank becomes substantially zero.

5. The fuel supply device of claim 1, wherein
   the inflow unit is disposed at a higher position than the fuel tank.

6. The fuel supply device of claim 1, wherein
   a storage capacity of the inflow unit is greater than a storage capacity of the common rail.

7. The fuel supply device of claim 1, further comprising:
   a high pressure pump that pumps the liquefied gas fuel pressurized in the common rail.

8. The fuel supply device of claim 7, further comprising:
   a temperature acquisition unit that obtains a temperature of each of the common rail and the inflow unit; and
   a pump control unit that causes the high pressure pump to operate based on a temperature difference between the common rail and the inflow unit.

9. A fuel supply device for recirculating a portion of a liquefied gas fuel supplied from a fuel tank to a common rail of an internal combustion engine, the portion of the liquefied gas fuel being recirculated through a return fuel path to the fuel tank, the fuel supply device comprising:
   an inflow unit disposed in the return fuel path that receives the liquefied gas fuel flowing in the return fuel path;
   a first control valve that controls a flow of the liquefied gas fuel from the common rail to the inflow unit;
   a second control valve that controls a flow of the liquefied gas fuel from the inflow unit to the fuel tank;
   a valve control unit that, after the internal combustion engine stops, repeatedly alternates between
      a first transfer state in which the valve control unit controls the second control valve to close and the first control valve to open, thereby transferring the liquefied gas fuel in the common rail to the inflow unit, and
      a second transfer state in which the valve control unit controls the first control valve to close and the second control valve to open, thereby transferring the liquefied gas fuel, which was transferred into the inflow unit during the first transfer state, into the fuel tank; and
   a high pressure pump that pumps the liquefied gas fuel pressurized in the common rail; wherein:
   the high pressure pump includes
      a pump body that forms a fuel path allowing the liquefied gas fuel to flow therethrough, and
      a discharge valve unit that opens according to a pressure of the liquefied gas fuel in the fuel path to allow the liquefied gas fuel to be discharged toward the common rail, wherein
   an opening pressure of the discharge valve unit is set to be higher than a difference between a pressure of the liquefied gas fuel in the fuel path when the internal combustion engine is stopped and a pressure of the liquefied gas fuel in the fuel tank.

10. The fuel supply device of claim 9, wherein
the pump body further includes a pressurizing chamber that pressurizes the liquefied gas fuel,
the high pressure pump includes a regulating valve unit that opens when a pressure of a gallery space increases to allow the liquefied gas fuel to be discharged from the gallery space, the gallery space being included in the fuel path and configured to supply fuel to the pressurizing chamber, and
an opening pressure of the regulating valve unit is set to be higher than the opening pressure of the discharge valve unit.

11. The fuel supply device of claim 1, further comprising:
a gas-liquid determination unit that determines whether the liquefied gas fuel in the common rail is vaporized, wherein
the valve control unit is configured to terminate the repetition of the first transfer state and the second transfer state when the gas-liquid determination unit determines that the liquefied gas fuel in the common rail has completely vaporized.

12. The fuel supply device of claim 1, wherein
the inflow unit is positioned outside of a space which houses the internal combustion engine.

13. A control method for a fuel supply device that recirculates a portion of a liquefied gas fuel supplied from a fuel tank to a common rail of an internal combustion engine, the portion of the liquefied gas fuel being recirculated through a return fuel path that connects the common rail to the fuel tank, the fuel supply device including i) a first control valve that controls a flow of the liquefied gas fuel from the common rail to an inflow unit disposed in the return fuel path, ii) a second control valve that controls a flow of the liquefied gas fuel from the inflow unit to the fuel tank, the second control valve disposed on the return fuel path between the inflow unit and the fuel tank, and iii) a processor that controls the first control valve and the second control valve, the control method comprising:
a first pressure acquisition step of, after the internal combustion engine stops, obtaining a pressure of each of the common rail and the inflow unit;
a first switching step of, based on a difference between the pressures obtained at the first pressure acquisition step, switching from
a first transfer state in which the second control valve is closed and the first control valve is opened to transfer the liquefied gas fuel in the common rail to the inflow unit, to
a second transfer state in which the first control valve is closed and the second control valve is opened to transfer the liquefied gas fuel, which was transferred to inflow unit, to the fuel tank;
a second pressure acquisition step of, after switching to the second transfer state, obtaining a pressure of each of the inflow unit and the fuel tank; and
a second switching step of, based on a difference between the pressures obtained at the second pressure acquisition step, switching from the second transfer state to the first transfer state.

* * * * *